(12) United States Patent
Wu

(10) Patent No.: US 7,483,081 B2
(45) Date of Patent: Jan. 27, 2009

(54) EDGE COMPENSATED FEATURE DETECTOR AND METHOD THEREOF

(75) Inventor: Jen-Shi Wu, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 664 days.

(21) Appl. No.: 11/163,677

(22) Filed: Oct. 27, 2005

(65) Prior Publication Data
US 2007/0098295 A1  May 3, 2007

(51) Int. Cl.
H04N 5/21 (2006.01)
(52) U.S. Cl. ........................ 348/625; 348/630
(58) Field of Classification Search ........... 348/625, 348/623, 607, 624, 627–630; 382/266, 274, 382/275; H04N 5/21
See application file for complete search history.

(56) References Cited
U.S. PATENT DOCUMENTS

| | | | |
|---|---|---|---|
| 5,196,736 A | 3/1993 | Doornhein et al. | |
| 5,204,747 A | 4/1993 | Shinkai | |
| 5,446,502 A * | 8/1995 | Lebowsky | 348/625 |
| 5,767,900 A * | 6/1998 | Tanji et al. | 348/625 |
| 5,790,205 A | 8/1998 | Pettitt et al. | |
| 6,008,862 A | 12/1999 | Bellers | |
| 6,094,205 A | 7/2000 | Jaspers | |
| 6,570,673 B2 | 5/2003 | Kishimoto | |
| 6,700,626 B2 | 3/2004 | Stessen et al. | |

* cited by examiner

*Primary Examiner*—Sherrie Hsia
(74) *Attorney, Agent, or Firm*—Winston Hsu

(57) ABSTRACT

An edge compensated feature detector includes a local difference unit receiving an incoming video signal and calculating a local difference value according to a component difference in a local area of a video frame formed by the incoming video signal; an adjustment unit coupled to the local difference unit for mapping the local difference value onto an edge gain value; a feature extraction unit for extracting a particular feature of the incoming video signal; and a multiplier coupled to the adjustment unit and the feature extraction unit for multiplying feature data corresponding to the output of the feature extraction unit with the edge gain value to thereby generate an edge compensated feature component.

20 Claims, 7 Drawing Sheets

EDGE COMPENSATED FEATURE DETECTOR AND METHOD THEREOF

BACKGROUND

The invention generally relates to enhancement of video signals, and more particularly, to performing feature detection on an incoming video signal.

In a typical display system using digital processing of data, a video signal input is received at a signal interface. If the signal is not already digital, it is digitized by an analog-to-digital (A/D) conversion. A resulting digital signal is then sent to a processor, where it undergoes several possible processing steps, depending upon the type and architecture of the system. Possibilities include, but are not limited to: interlace to progressive scan (proscan) conversion (for interlaced signals); scaling; motion and edge detection interpolation; and color space conversion.

Some of these functions involve the application of low pass interpolation filters, such as proscan and scaling. For example, in typical broadcast signal display systems using NTSC television signals, the data is interlaced when displayed. Interlacing involves dividing a video frame of data into two fields: one with the odd-numbered lines of the field, the other with the even-numbered lines. This method came about because of the operation of the cathode ray tube (CRT), which makes two scans across a display screen per frame. A proscan operation is used to provide interlace-to-progressive-scan (proscan) conversion. Proscan conversion includes low pass filtering and therefore results in a lessening of the sharpness of an image.

Another process that results in decreased sharpness is scaling. Scaling is performed on images of one format to enlarge or shrink the image to fit another format. For example, standard 4:3 aspect ratio Letterbox NTSC must be scaled horizontally and vertically in order to fit on a 16:9 aspect ratio display. That is, the incoming data must be scaled to form data to be displayed in the other format. This processing also includes low pass interpolation operations and results in decreased sharpness.

Generally speaking, any operation having low pass interpolation filter properties results in a loss of detail in the image. Therefore, at some point in the processing of the data, sharpness control is typically added to the image.

FIG. 1 shows an example block diagram of a typical sharpness control unit 100. An incoming input image undergoes horizontal and vertical filtering by filters 102 and 104, respectively. The filtered image is then multiplied by a scaling factor that increases or decreases the magnitude of the filtered image, and the filtered image is recombined with the original image. The multiplied scaling factor is referred to as "gain," and the process of multiplication at gain unit 106 is referred to as "applying gain." The filtered image is also referred to as the "feature component." As shown in FIG. 1, gain is added to the image at gain stage 106, and the filtered image with gain is then added back into the original image at adder 108. The sharpness adjustment results in an emphasis on the higher frequency edges in the image, with only higher frequency information being passed as an enhancement signal in both dimensions. This means that only point like objects and diagonal lines will be enhanced. While the resulting image will have some sharpness increase, it is not nearly as sharp as desired.

One problem with such an approach is that only objects that have both a horizontal and a vertical edge component will be acted upon by the sharpness process. Additionally, the implementation of FIG. 1 adds gain after the image data has undergone the low pass (or band pass) filter functions, resulting in an image that only has enhanced high frequency edges. Examples of high frequency horizontal and vertical edges components include diagonals and point objects. However, the filtering process does increase sharpness for data of those objects to which it does apply.

An additional problem with the typical sharpness control unit 100 shown in FIG. 1 is that "soft edges" are enhanced very little, and "hard edges" are enhanced a lot. The term soft "soft edge" refers to an edge that is visually not very pronounced. For example, a soft edge is an edge in a video picture that is blurry or is formed by a slight change in luminance value. The term "hard edge" refers to an edge that is visually very pronounced. For example, a hard edge is a very clear edge or a distinct edge formed by a large change in luminance value. The typical sharpness control unit 100 shown in FIG. 1 applies a gain using the gain unit 106. Because the filtered component corresponding to a soft edge is a very small value, even after applying the gain, soft edges are only minimally enhanced in the resulting image. Conversely, because the filtered component corresponding to a hard edge is a very large value, after applying the gain, hard edges are greatly enhanced in the resulting image. This is not an ideal situation because hard edges, by definition, were already clearly visible in the original image. It would be desirable to greatly increase the sharpness of soft images. However, if the gain of the gain unit 106 is increased in an attempt to sufficiently enhance soft edges, a well known problem of overshoot (and undershoot) occurs on the hard edges. Therefore, the typical sharpness control unit 100 can only provide a very limited sharpness enhancement on soft edges to avoid adding overshoot (and undershoot) effects to the image signal.

SUMMARY

According to an exemplary embodiment, an edge compensated feature detector is disclosed comprising a local difference unit receiving an incoming video signal and calculating a local difference value according to a component difference in a local area of a video frame formed by the incoming video signal; an adjustment unit coupled to the local difference unit for mapping the local difference value onto an edge gain value; a feature extraction unit for extracting a particular feature of the incoming video signal; and a multiplier coupled to the adjustment unit and the feature extraction unit for multiplying feature data corresponding to the output of the feature extraction unit with the edge gain value to thereby generate an edge compensated feature component.

According to another exemplary embodiment, a method of performing edge compensated feature detection is disclosed comprising calculating a local difference value according to a component difference in a local area of a video frame formed by an incoming video signal; utilizing a mapping function to output an edge gain value according the local difference value; extracting a particular feature of the incoming video signal; and multiplying feature data corresponding to the particular extracted feature with the edge gain value to thereby generate an edge compensated feature component.

According to another exemplary embodiment, a video system is disclosed comprising an input interface, a sharpness control unit, and an output unit. The input interface receives an incoming video signal in a digital form. The sharpness control unit comprises a local difference unit for calculating a local value of contrast within a local area according to a difference of luminance in the local area of a video frame formed by the incoming video signal; an adjustment unit coupled to the local difference unit for mapping the local value of contrast onto an edge gain value; a feature extraction unit for extracting a particular feature of the incoming video signal; a multiplier coupled to the adjustment unit and the feature extraction unit for multiplying feature data corresponding to the output of the feature extraction unit with the edge gain value to thereby generate an edge compensated feature component; and a combining unit for combining the video frame with the edge compensated feature component to generate a resulting image. The output unit renders the resulting image.

DETAILED DESCRIPTION

Figure 6:
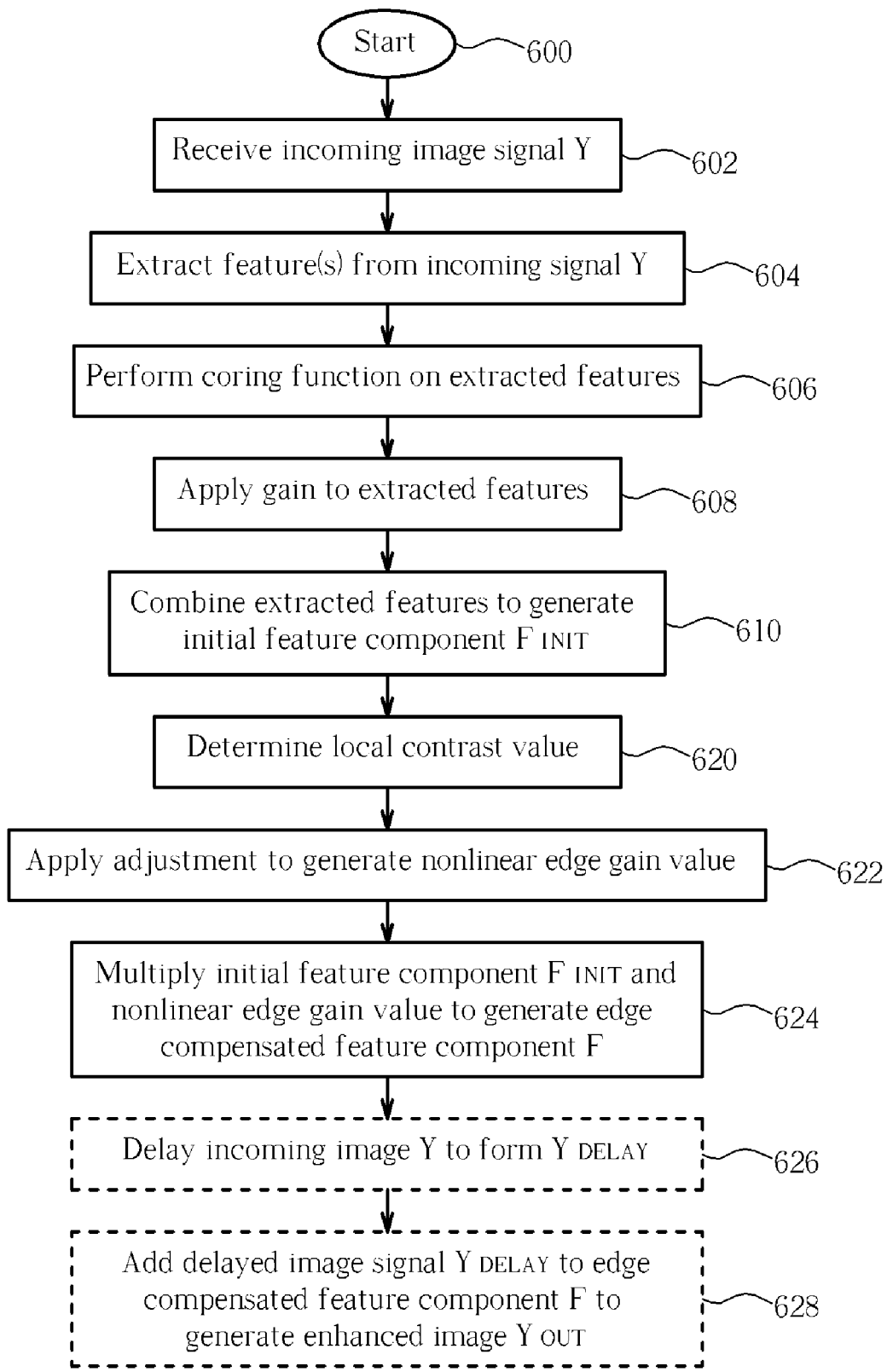
FIG. 6 shows a generalized method of performing edge compensated feature detection according to an exemplary embodiment.
Figure 7:
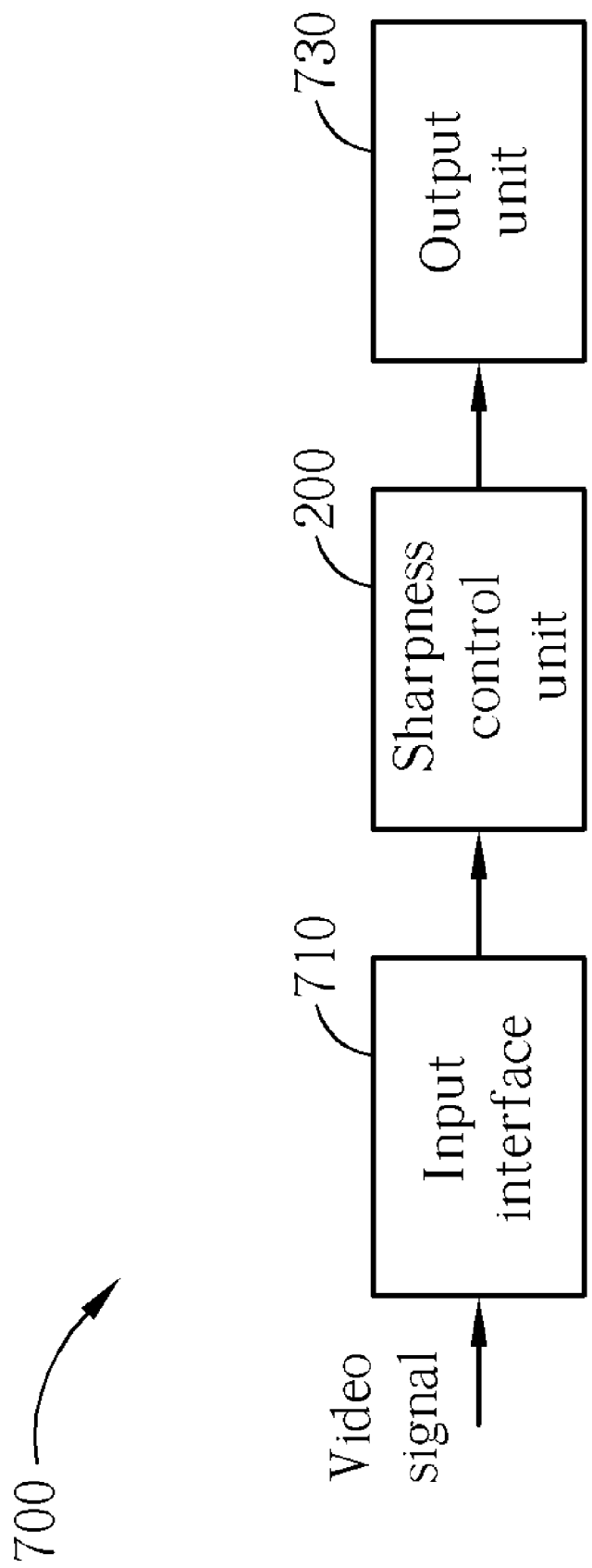
FIG. 7 is a block diagram illustrating an exemplary embodiment of a video system incorporating the sharpness control unit of FIG. 2.

Referring to FIG. 7, an exemplary embodiment of a video system with sharpness control is illustrated and identified by reference numeral 700. As depicted, the video system 700 comprises an input interface 710, a sharpness control unit 200, and an output unit 730. The input interface receives 710 an incoming video signal in a digital form. The sharpness control unit 200 enhances the sharpness of images formed by the incoming video signal and generates resulting images. The output unit 730 operates to render the resulting images. The sharpness control unit 200 will be described in detail below by way of FIG. 2 through FIG. 6.

Figure 1:
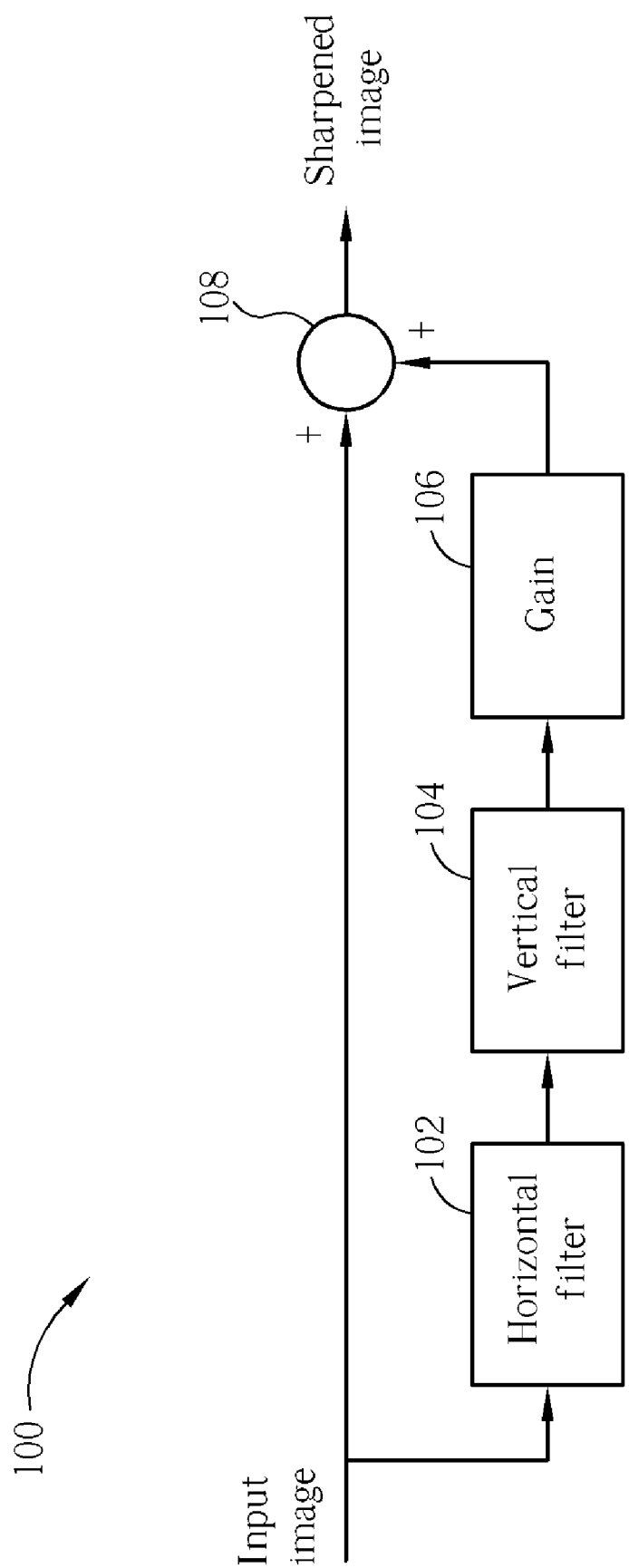
FIG. 1 is an example block diagram of a typical sharpness control unit.
Figure 2:
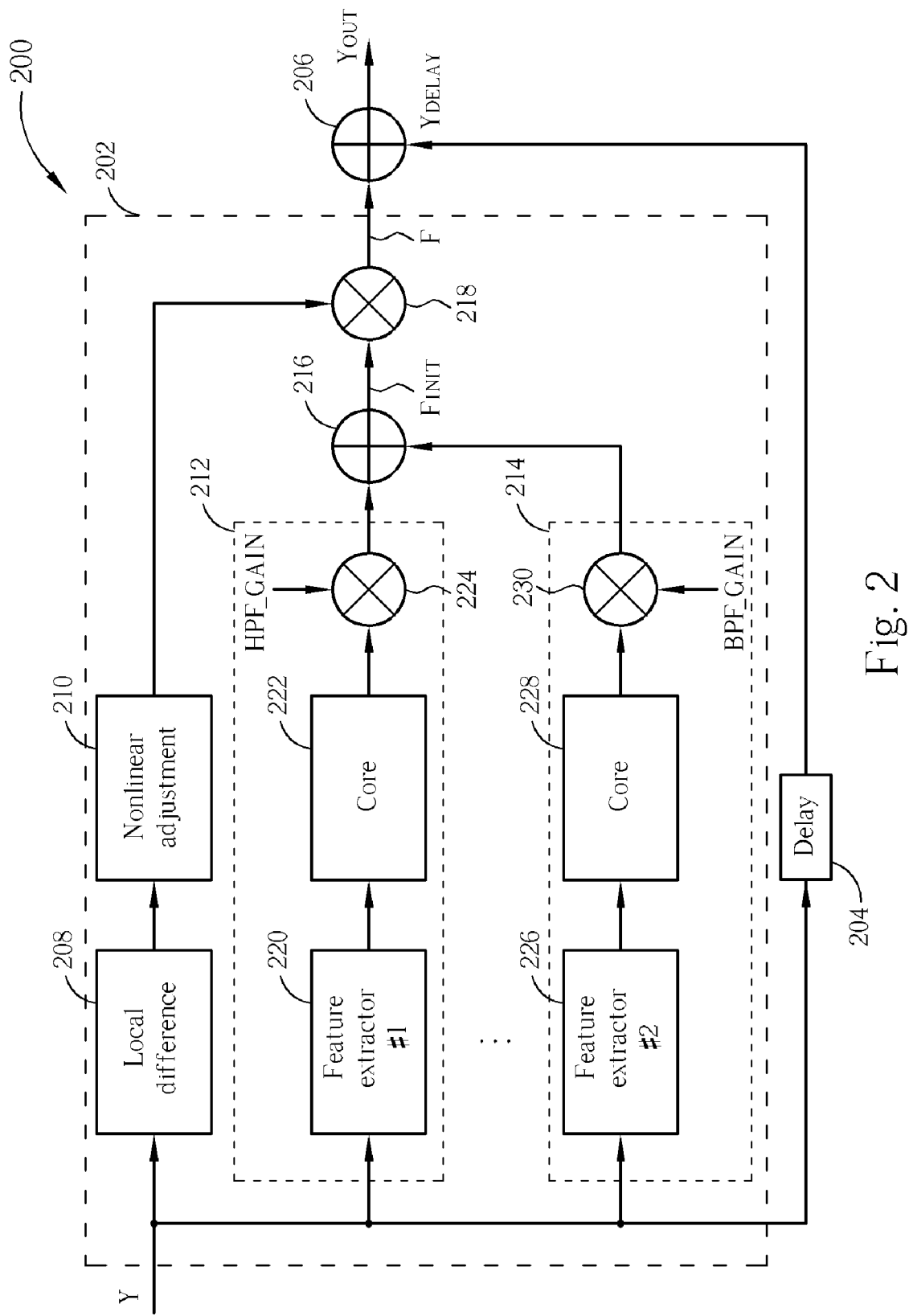
FIG. 2 is a block diagram of an edge compensated feature detector being utilized in a sharpness control unit according to an exemplary embodiment.

FIG. 2 shows a block diagram of an edge compensated feature detector 202 being utilized in the sharpness control unit 200 according to an exemplary embodiment. The sharpness control unit 200 includes the feature detector 202, a delay unit 204, and a combining unit 206. The edge compensated feature detector 202 receives an incoming image Y and generates an edge compensated feature component F. The delay unit 204 provides a delay that corresponds to the processing time of the edge compensated feature detector 202. The combining unit 206 then combines the delayed image $Y_{DELAY}$ being outputted from the delay unit 204 with the edge compensated feature component F outputted by the edge compensated feature detector 202 to thereby generate a resulting image $Y_{OUT}$ having enhanced sharpness of soft edges.

In the exemplary embodiment shown in FIG. 2, the edge compensated feature detector 202 includes a local difference unit 208, an adjustment unit 210, an adder 216, a multiplier 218, and a plurality of feature extraction units 212, 214. More specifically, as shown in FIG. 2, two feature extraction units 212, 214 are shown in this example. A first feature extraction unit 212 includes a first feature extractor 220, a first core function 222, and a first gain multiplier 224; and the second feature extraction unit 214 includes a second feature extractor 226, a second core function 222, and a second gain multiplier 230. It should be noted that a single feature extraction units or more than two feature extraction units could also be used in other embodiments.

Each of the feature extraction units 212, 214 extracts, filters, and amplifies a particular type of feature from the incoming image Y. For example, the first feature extractor 220 of the first feature extraction unit 212 could be configured to extract horizontal edges, while the second feature extractor 226 of the second feature extraction unit 226 could be configured to extract vertical edges. That is, the first feature extractor 220 filters the incoming image Y to extract horizontal edges, the first core function 222 applies a coring function that brings data that is under a first threshold to zero, and the first gain multiplier 224 multiplies the resulting filtered edge compensated feature component by a first predetermined gain value HPF_GAIN. Similarly, the second feature extractor 226 filters the incoming image Y to extract vertical edges, the second core function 228 applies a coring function that brings data that is under a second threshold to zero, and the second gain multiplier 230 multiplies the resulting filtered edge compensated feature component by a second predetermined gain value BPF_GAIN.

Figure 3:
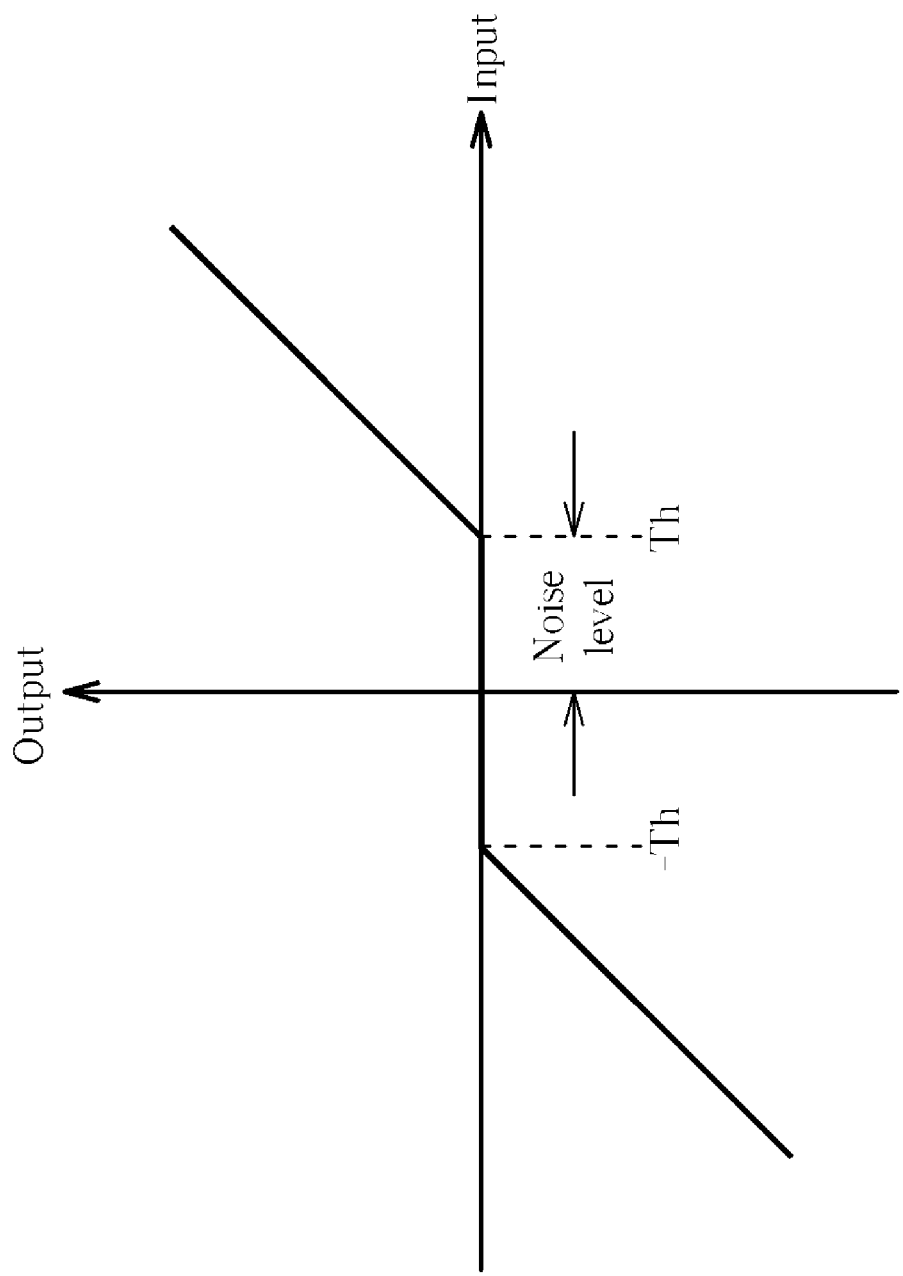
FIG. 3 shows a graph representing the coring functions applied by the first and second core functions.

FIG. 3 shows a graph representing the coring functions applied by the first and second core functions 222, 228. A non-linear coring function is applied to the data. As is shown in FIG. 3, only data on either side of a noise level is used. The noise level is specified using a threshold value Th. It should be noted that the particular threshold Th used by the first core function 222 can be different than that used by the second core function 228. The coring function serves to eliminate noise in the data and brings data that is under the threshold to zero. Noise data typically will not reach a magnitude that is over the threshold value and therefore the noise data is eliminated. Typically, the nature of the coring function requires a digital processing solution.

As shown in FIG. 2, after the data is cored at the first core function 222, gain is applied at the first gain multiplier 224. The value of the first predetermined gain value HPF_GAIN corresponds to the gain desired for the particular feature extracted by the feature extractor 220, which in this example is a high pass filtering operation to extract horizontal edges. The resulting feature data outputted by the first gain filter 224 is then recombined with feature data outputted by the other features extractor units at the adder 216 to thereby form an initial feature component $F_{INIT}$.

Figure 4:
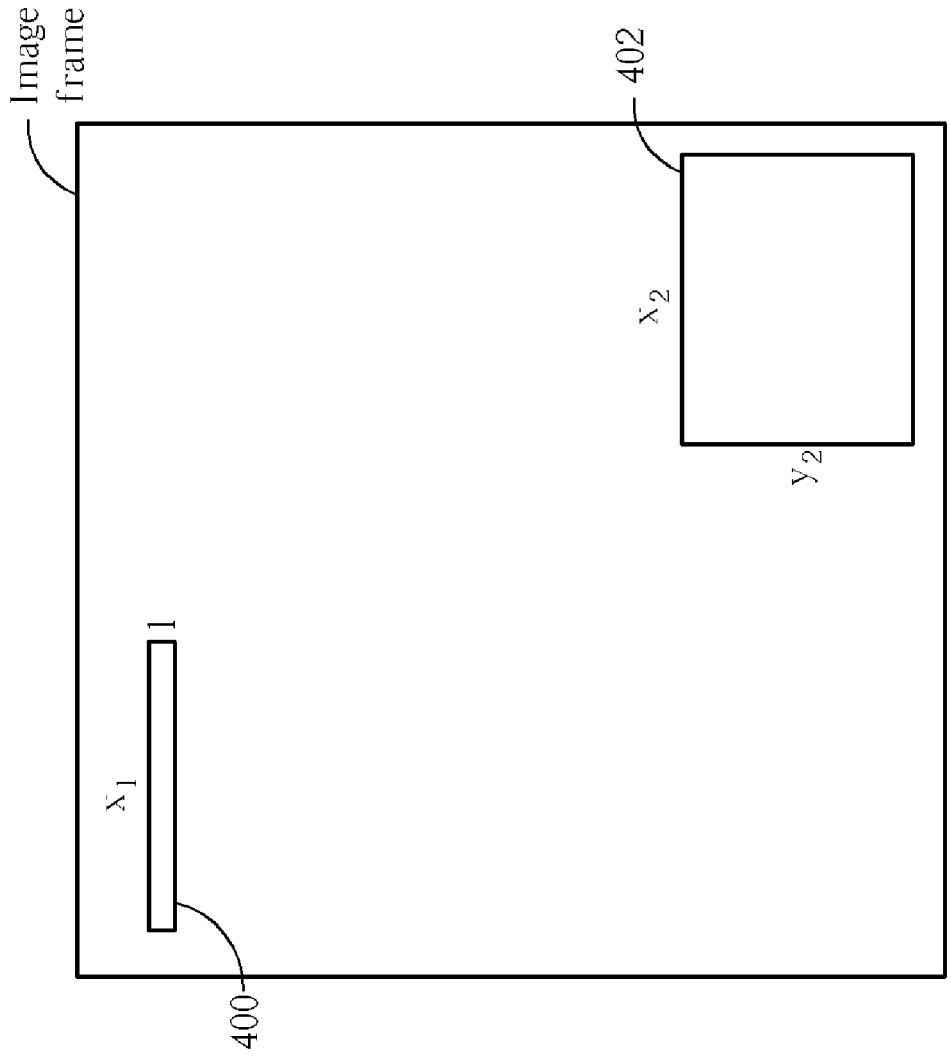
FIG. 4 shows two examples of predetermined windows that could be used to calculate local contrast by the local contrast unit of FIG. 2.

FIG. 4 shows two examples of predetermined windows 400, 402 that could be used to calculate a local difference vale by the local difference unit 208 of FIG. 2. In order to detect soft edges, the local difference unit 208 detects local contrast within a particular local area of the image. In this regard, the local difference unit calculates a local difference value according to a component difference in a local area of a video frame formed by the incoming video signal. Typically, color is expressed in terms of a luminance component and two chrominance components. Local contrast detection is performed according to a maximum difference between luminance values within a predetermined window in the local area. For example, as shown in FIG. 4, the window could be a one-dimensional window 400 being a row of a certain number of pixels $x_1$, or two-dimensional window 402 of a certain number of pixels $x_2$ by a certain number of pixels $y_2$. The actual position of the window 400, 402 moves throughout the image frame along with the feature extraction. In both these exemplary embodiments, the local difference values namely local contrast can be calculated according to the following formula:

Local Contrast=Max−Min (Formula 1)

where the value Max corresponds to the maximum luminance value within the predetermined window, and the value Min corresponds to the minimum luminance value within the predetermined window.

In this way, the local difference unit 208 detects the "hardness" of any edges of the area of the incoming image to which sharpness enhancement is being performed. That is, as the sharpness control unit 200 performs processing on the incoming image Y, the local difference unit 208 continually detects local contrast in a window of the incoming image corresponding to the area of the image that feature extraction is taking place. If the current area of the image being processed by the sharpness control unit 200 includes only soft edges, the local difference unit 208 will output a lower value. Alternatively, if the current area of the image being processed by the sharpness control unit 200 includes a hard edge, the local difference unit 208 will output a higher value. Generally speaking, the more pronounced an edge in the predetermined window, the larger the local difference value outputted by the local difference unit 208.

Figure 5:
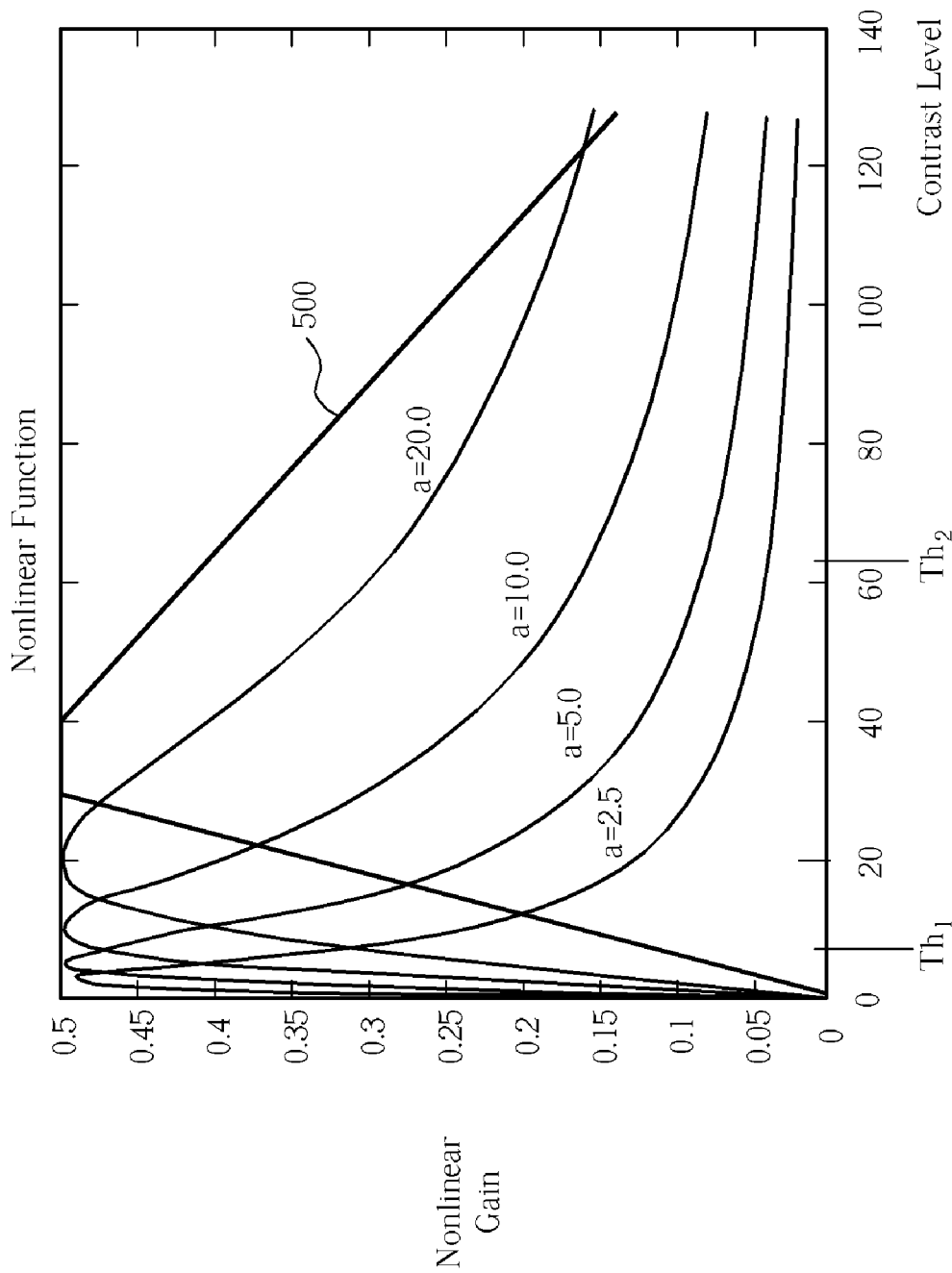
FIG. 5 shows an exemplary graph of the nonlinear mapping function applied by the adjustment unit of FIG. 2.

FIG. 5 shows an exemplary graph of the nonlinear mapping function applied by the adjustment unit 210 of FIG. 2. As shown in FIG. 5, in this embodiment, the adjustment unit 210 performs a non-linear mapping between the local difference value (local contrast) and an edge gain value. In FIG. 5, the x-axis corresponds to the local contrast level outputted by the local contrast unit 208, and the y-axis corresponds to the resulting nonlinear edge gain value outputted by the adjustment unit 210. In this exemplary embodiment, the nonlinear mapping function applied by the adjustment unit 210 is calculated according to the following formula:

$$\text{Nonlinear\_Gain} = \frac{ax}{(x^2 + a^2)} \quad \text{(Formula 2)}$$

where the parameter a is a user defined constant.

Several different curves are shown in FIG. 5, where each curve corresponds to a different constant value of the a parameter. In general, each of the curves provides the following characteristics:

(a) For very low contrast levels (at zero or slightly above zero), the nonlinear edge gain value is very low.

(b) At slightly higher contrast levels, the nonlinear edge gain value is very high.

(c) At much higher contrast levels, the nonlinear edge gain value falls off again.

Characteristic (a) ensures that the adjustment unit 210 applies no gain (or substantially very little gain) to edges in the image caused by noise. Characteristic (b) ensures that the adjustment unit 210 applies very high gain to soft edges in the image that are true edges (i.e., not caused by noise). Finally, characteristic (c) ensures that the adjustment unit 210 applies low gain to edges that are already well pronounced in the image, which prevents overshoot and undershoot around hard edges. For example, using the a=20.0 curve in FIG. 5, to satisfy these requirements the adjustment unit 210 generates low gain values for contrast levels between zero and a predetermined first threshold level $Th_1$, high gain values for soft edges having contrast levels between the predetermined first threshold level $Th_1$ and a predetermined second threshold level $Th_2$, and low gain values for hard edges having a contrast level higher than the predetermined second threshold level $Th_2$.

As shown in FIG. 2, the multiplier 218 multiplies the initial feature component $F_{INIT}$ and the nonlinear edge gain value outputted by the nonlinear adjustment 210 to generate the edge compensated feature component F. The edge compensated feature component F represents the detected features (horizontal and vertical in this example) in the incoming image signal Y and is compensated for edge "hardness". This ensures that edges that may be due to noise are not enhanced, soft edges are greatly enhanced, and hard edges that are already apparent in the original image are not enhanced as much to prevent overshoot and undershoot artifacts in the resulting image. In order to enhanced the sharpness of soft edges in the original image signal Y, the combining unit 206 such as an adder then adds the delayed image $Y_{DELAY}$ being outputted from the delay unit 204 with the edge compensated feature component F outputted from the edge compensated feature detector 202 to thereby generate the resulting image $Y_{OUT}$ having enhanced sharpness.

It should also be noted that other embodiments of the adjustment unit 210 are also possible. For example, different nonlinear formulas other than Formula 2 could be used. For example, FIG. 5 shows an example of a piece-wise linear function 502 that could alternatively be used. In another embodiment, the nonlinear adjustment unit 210 could be implemented as a lookup table providing a nonlinear adjustment mapping having the above mentioned characteristics.

As will be apparent to those of ordinary skill in the art after reading this disclosure, the edge compensated feature detector 202 could be used to generate an edge compensated feature component F in other operations and is not limited to only being used when enhancing the sharpness of an incoming image signal Y. That is, any feature that can be detected in the incoming image Y can be compensated with respect to edges in the corresponding image frame using the same principles described above for the edge compensated feature detector 202. For example, in another exemplary embodiment, chrominance values could be used instead of luminance values to enhance the color edges of the incoming image. In another embodiment, the edge compensated feature component F outputted by the edge compensated feature detector 202 could be used to simply detect a particular feature (or features) of the incoming image Y. For example, soft edges in the incoming image Y are detected by the above described edge compensated feature detector 202. However, as previously mentioned, other features such as hard edges or other features could also be detected.

FIG. 6 shows a generalized method of performing edge compensated feature detection according to an exemplary embodiment. In this example, the feature detection operations are performed as part of the sharpness enhancement operations of edges in the incoming image signal Y. It should be noted that provided substantially the same result is achieved, the steps of the flowchart shown in FIG. 6 need not be in the exact order shown and need not be contiguous, that is, other steps can be intermediate. As shown in FIG. 6, the method of feature detection contains the following steps:

Step 600: Start feature detection operations. In this example, the feature detection operations are performed as part of the sharpness enhancement operations of edges in the incoming signal Y.

Step 602: Receive the incoming image signal Y.

Step 604: Extract the feature(s) from the incoming signal Y to be detected. For example, as shown in FIG. 2, both horizontal edges and vertical edges are extracted. Note that additional (or different) features of the incoming signal Y could also be extracted.

Step 606: Perform a coring function on the extracted features to remove noise.

Step 608: Apply gain to the extracted features. Each feature extracted could be multiplied by a different gain value according to the particular properties of the feature to thereby form feature data.

Step 610: Combine the extracted features to generate an initial feature component $F_{INIT}$. For example, add together all the respective extracted feature data.

Step 620: Determine a local difference value by detecting a component difference within a particular area of the image. For example, local contrast detection can be performed according to a maximum difference between luminance values within a predetermined window of the image frame in order to detect the hardness of edges in the particular area. In another exemplary embodiment, chrominance values could be used instead of luminance values to enhance the color edges of the incoming image.

Step 622: Apply an adjustment to the local difference value to generate a nonlinear edge gain value. As previously mentioned, the adjustment should be such that (a) for very low contrast levels (at zero or slightly above zero), the nonlinear edge gain value is also very low; (b) at slightly higher contrast levels, the nonlinear edge gain value is very high; and (c) at higher contrast levels, the nonlinear edge gain value falls off again.

Step 624: Multiply the initial feature component $F_{INIT}$ and the nonlinear edge gain value to generate the edge compensated feature component F.

Additionally, shown in FIG. 6 as an example, to further perform the sharpness enhancement of the original image Y, the following two steps are also performed. However, it should be noted that steps 626 and 628 are not required if sharpness enhancement of the original image Y is undesired.

Step 626: Delay the incoming image Y by an amount of time corresponding to the processing time of steps 600 to 624 to thereby generate a delayed image signal $Y_{DELAY}$.

Step 628: Add the delayed image signal $Y_{DELAY}$ to the edge compensated feature component F to thereby generate an enhanced image $Y_{OUT}$.

One advantage of the edge compensated feature detector 202 and the generalized method of performing edge compensated feature detection is that the feature extraction is performed separately for each of the desired features. This allows the implementation methods of the feature extraction units to be independent of one another. For example, the vertical feature extractor 214 of FIG. 2 could be implemented in hardware, software, or a combination of both. Similarly the horizontal feature extractor 212 could be implemented in hardware, software or a combination of both. Additionally, the local contrast is detected and a nonlinear edge gain value is generated corresponding to local contrast. This ensures that edges that may be due to noise are not enhanced, soft edges are greatly enhanced, and hard edges that are already apparent in the original image are not enhanced as much to prevent overshoot and undershoot artifacts in the resulting image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An edge compensated feature detector comprising:
a local difference unit receiving an incoming video signal and calculating a local difference value according to a component difference in a local area of a video frame formed by the incoming video signal;
an adjustment unit coupled to the local difference unit for mapping the local difference value onto an edge gain value;
a feature extraction unit for extracting a particular feature of the incoming video signal; and
a multiplier coupled to the adjustment unit and the feature extraction unit for multiplying feature data corresponding to the output of the feature extraction unit with the edge gain value to thereby generate an edge compensated feature component.

2. The edge compensated feature detector of claim 1, further comprising a plurality of feature extraction units, each feature extraction unit for extracting a different feature of the incoming video signal; and an adder for adding together the outputs of the feature extractions units to thereby generate the feature data.

3. The edge compensated feature detector of claim 2, wherein a first feature extraction unit is for extracting vertical edges in the video frame, and a second feature extraction unit is for extracting horizontal edges in the video frame.

4. The edge compensated feature detector of claim 1, wherein the component difference is a contrast level derived from a difference of luminance, and the local difference unit calculates the local difference value comprising a maximum contrast level within the local area.

5. The edge compensated feature detector of claim 4, wherein the adjustment unit is for generating low gain values for contrast levels below a predetermined first level, high gain values for soft edges having contrast levels between the predetermined first level and a predetermined second level, and low gain values for hard edges having a contrast level higher than the predetermined second level.

6. The edge compensated feature detector of claim 5, wherein the adjustment unit comprises a non-linear mapping function.

7. The edge compensated feature detector of claim 5, wherein the adjustment unit comprises a lookup table to perform the mapping function.

8. The edge compensated feature detector of claim 1, wherein the local difference unit is for calculating a maximum difference between chrominance values within a predetermined window in the local area of the video frame.

9. The edge compensated feature detector of claim 1, wherein the feature extraction unit comprises:
a feature extractor coupled to the incoming image signal for filtering the incoming image signal to thereby extract the particular feature;
a core function coupled to the feature extractor for removing noise from the output of the feature extractor; and
a gain multiplier for applying gain to the output of the core function.

10. A method of performing edge compensated feature detection comprising:
calculating a local difference value according to a component difference in a local area of a video frame formed by an incoming video signal;
utilizing a mapping function to output an edge gain value according the local difference value;
extracting a particular feature of the incoming video signal; and multiplying feature data corresponding to the particular extracted feature with the edge gain value to thereby generate an edge compensated feature component.

11. The method of claim 10, further comprising:
extracting a plurality of different features of the incoming video signal; and
adding together the particular extracted features to thereby generate the feature data.

12. The method of claim 11, further comprising extracting vertical edges in the video frame, and extracting horizontal edges in the video frame.

13. The method of claim 10, wherein the component difference is a contrast level derived from a difference of luminance, and the local difference value comprising a maximum contrast level within the local area of the video frame.

14. The method of claim 13, wherein the mapping function is for generating low gain values for contrast levels below a predetermined first level, high gain values for soft edges having contrast levels between the predetermined first level and a predetermined second level, and low gain values for hard edges having a contrast level higher then the predetermined second level.

15. The method of claim 14, wherein the mapping function is a non-linear mapping function.

16. The method of claim 14, wherein the mapping function is a lookup table utilized to perform the mapping function.

17. The method of claim 10, wherein the calculating a local difference value further comprises calculating a maximum difference between chrominance values within a predetermined window in the local area of the video frame.

18. The method of claim 10, wherein extracting the particular feature of the incoming video signal further comprises:
filtering the incoming image signal to thereby extract the particular feature;
removing noise from the particular extracted feature; and
applying gain to the particular extracted feature.

19. A video system comprising:
an input interface receiving an incoming video signal in a digital form;
a sharpness control unit comprising:
a local difference unit for calculating a local value of contrast within a local area according to a difference of luminance in the local area of a video frame formed by the incoming video signal;
an adjustment unit coupled to the local difference unit for mapping the local value of contrast onto an edge gain value;
a feature extraction unit for extracting a particular feature of the incoming video signal;
a multiplier coupled to the adjustment unit and the feature extraction unit for multiplying feature data corresponding to the output of the feature extraction unit with the edge gain value to thereby generate an edge compensated feature component; and
a combining unit for combining the video frame with the edge compensated feature component to generate a resulting image; and
an output unit rendering the resulting image.

20. The video system of claim 19, wherein the adjustment unit is for generating low gain values for contrast levels below a predetermined first level, high gain values for soft edges having contrast levels between the predetermined first level and a predetermined second level, and low gain values for hard edges having a contrast level higher than the predetermined second level.

* * * * *